United States Patent
Grillet

(10) Patent No.: US 10,338,333 B2
(45) Date of Patent: Jul. 2, 2019

(54) DEVICE AND METHOD FOR INSERTING AN OPTICAL FIBER ONTO A BOBBIN

(71) Applicant: Conductix Wampfler France, Colombes (FR)

(72) Inventor: Michel Grillet, La Motte Servolex (FR)

(73) Assignee: Conductix Wampfler France, Colombes (FR)

( * ) Notice: Subject to any disclaimer, the term of this patent is extended or adjusted under 35 U.S.C. 154(b) by 87 days.

(21) Appl. No.: 15/569,268

(22) PCT Filed: Apr. 29, 2016

(86) PCT No.: PCT/FR2016/051008
§ 371 (c)(1),
(2) Date: Oct. 25, 2017

(87) PCT Pub. No.: WO2016/174365
PCT Pub. Date: Nov. 3, 2016

(65) Prior Publication Data
US 2018/0120529 A1    May 3, 2018

(30) Foreign Application Priority Data
Apr. 29, 2015    (FR) ..................... 15 53841

(51) Int. Cl.
| | | |
|---|---|---|
| G02B 6/25 | (2006.01) |
| G02B 6/44 | (2006.01) |
| B65H 54/34 | (2006.01) |
| B65H 54/71 | (2006.01) |
| B65H 57/04 | (2006.01) |
| B65H 57/14 | (2006.01) |

(52) U.S. Cl.
CPC ......... *G02B 6/4457* (2013.01); *B65H 54/343* (2013.01); *B65H 54/71* (2013.01); *B65H 57/04* (2013.01); *B65H 57/14* (2013.01); *G02B 6/25* (2013.01); *B65H 2701/32* (2013.01)

(58) Field of Classification Search
CPC ...... B65H 54/343; B65H 54/71; B65H 57/04; B65H 57/14; B65H 2701/32; G02B 6/25; G02B 6/4457
See application file for complete search history.

(56) References Cited

U.S. PATENT DOCUMENTS

2013/0284843 A1    10/2013    Mertesdorf

FOREIGN PATENT DOCUMENTS

| EP | 0 509 384 A2 | 10/1992 |
| JP | H08 327831 A | 12/1996 |

OTHER PUBLICATIONS

International Search Report dated Jul. 14, 2016.
Preliminary Search Report dated Apr. 5, 2016.

*Primary Examiner* — William E Dondero
(74) *Attorney, Agent, or Firm* — Ryan T. Grace; Advent, LLP

(57) ABSTRACT

The invention relates to a device (6) for inserting an optical fiber (100) through a port (110) in a rim (11) of a bobbin, characterized in that along the direction in which the optical fiber runs, the device comprises:
  a system (60, 61) for moving the optical fiber along,
  a tool (63) for cutting the optical fiber,
  a first optical fiber-guiding element (65) comprising a slot, the base (650) of which defines a curve between an inlet (651) facing the moving system (60, 61) and an outlet (652) that is to face the port (110) in the rim of the bobbin.

7 Claims, 6 Drawing Sheets

DEVICE AND METHOD FOR INSERTING AN OPTICAL FIBER ONTO A BOBBIN

SCOPE OF THE INVENTION

This invention relates to a device and a method for inserting an optical fibre onto a bobbin.

BACKGROUND OF THE INVENTION

From manufacturing an optical fibre, a certain length of said optical fibre is wound on a bobbin in view of its storage and its transport to a place of use. This length is typically of the order of a few kilometers.

In view of being able to test a sample of optical fibre from said bobbin, it is known to wind an excess length of optical fibre over a dedicated magazine arranged in the bobbin. This excess length corresponding to a portion of the optical fibre first wound over the bobbin, such a magazine allows making this excess length accessible after winding the whole of the fibre.

FIG. 1A is a perspective view of a bobbin 1', of known type, comprising such a magazine.

The bobbin 1' comprises a cylindrical reel 10 to receive the optical fibre, and two rims 11, 12 which extend radially to each end of the reel 10 in order to axially retain the optical fibre wound over the reel.

One of the two rims (in this case, the rim 11) is provided with a port 110 for the optical fibre 100.

Said rim 11 separates the reel 10 from a cylindrical magazine 13 which is intended to receive an excess length 100' of optical fibre.

As can be best seen in FIG. 1B, the rim has a circumferential edge 130 to axially retain the excess length 100' of optical fibre wound over the magazine.

To wind an excess length 100' of optical fibre over the magazine, an operator passes a portion 100' of optical fibre of the desired length through the port 110 (from the reel towards the magazine) then manually winds this portion of optical fibre over the magazine 13, behind the circumferential edge 130. Then, to avoid any unintentional unwinding of the optical fibre, he attaches its end 100" onto the rim 11 by means of an adhesive 101.

This manual operation takes a long time and is costly.

The document EP 0 509 384 discloses a device for inserting an optical fibre through a port arranged in a rim of a bobbin.

BRIEF DESCRIPTION OF THE INVENTION

An aim of the invention is to automate the positioning of said excess length of optical fibre over the magazine, and more specifically, to design a device allowing the optical fibre to be passed automatically through the port arranged in the rim of the bobbin.

According to the invention, a device for inserting an optical fibre through a port arranged in a rim of a bobbin is proposed, characterised in that it comprises, along the direction in which the optical fibre runs:
  a system for moving the optical fibre along,
  a tool for cutting the optical fibre,
  a first optical fibre-guiding element comprising a slot, the base of which defines a curve between an inlet facing the moving system and an outlet that is to face the port in the rim of the bobbin.

According to an embodiment, this device further comprises, between the cutting tool and the first guiding element, a second guiding element, comprising a conic portion that has an inlet of the optical fibre that is wider than outlet of the optical fibre.

Particularly advantageously, the second guiding element comprises a cylindrical portion downstream of the conic portion along the direction in which the optical fibre runs.

According to an embodiment, the system for moving the optical fibre along, comprises two rollers, arranged over the direction in which the optical fibre runs, so as to exert a pressure on the optical fibre, one of said rollers being rotated by a motor.

Another aim of the invention relates to a machine for producing an optical fibre, characterised in that it comprises an insertion device, such as defined above.

According to an embodiment, said machine further comprises:
  at least one capstan and at least one pulley, said capstan(s) and pulley(s) defining a direction in which the optical fibre runs in a main area of said machine,
  an optical fibre-guiding system comprising a transmission body and a clamping element, rigidly connected to said body, able to hold an end of the optical fibre, said transmission body being arranged parallel to the direction in which the optical fibre runs.

Another aim of the invention relates to a method for inserting an optical fibre through a port, arranged in a rim of a bobbin by means of a device such as defined above.

Said method successively comprises:
  the supply of said insertion device, the port being positioned facing the outlet of the first guiding element,
  the insertion of the optical fibre into the moving system,
  the cutting of the optical fibre by the cutting tool,
  moving the end of the optical fibre along towards the inlet of the first guiding element and the guiding of the optical fibre in the slot up to the outlet.

BRIEF DESCRIPTION OF THE DRAWINGS

Other characteristics and advantages of the invention will emerge from the detailed description which will follow, in reference to the appended drawings, whereon.

DETAILED DESCRIPTION OF EMBODIMENTS OF THE INVENTION

Figure 1A:
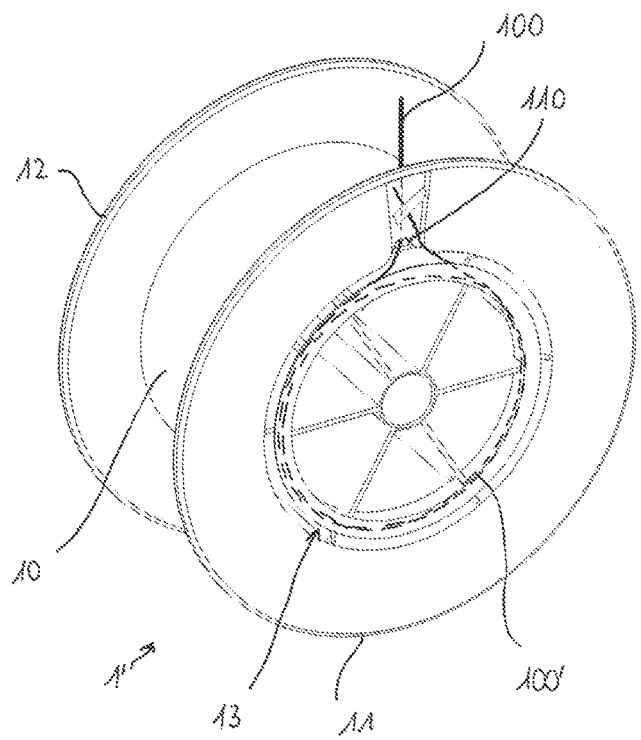
FIG. 1A is a perspective view of a bobbin comprising a magazine, whereon an excess length of optical fibre is wound.
Figure 1B:
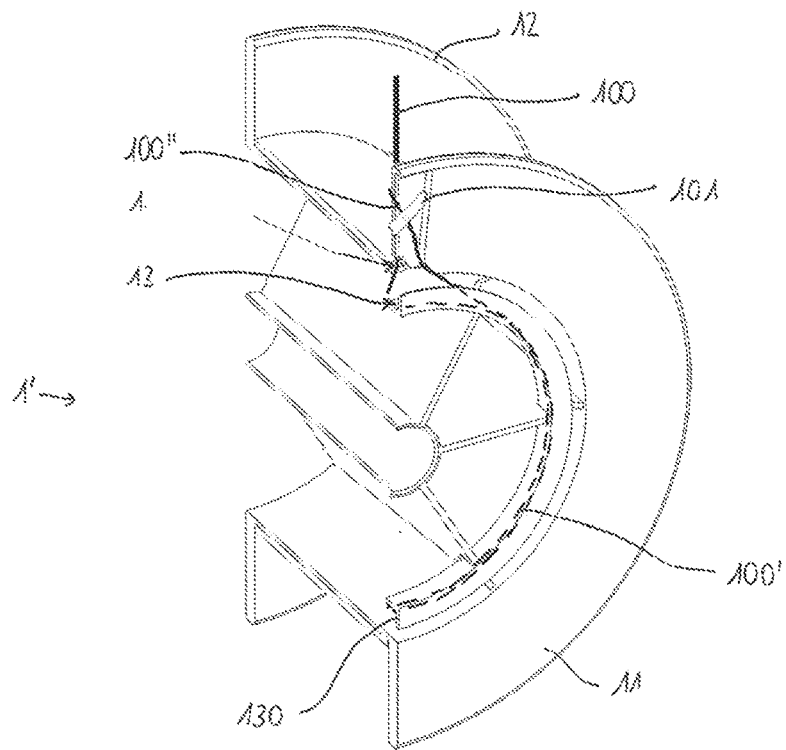
FIG. 1B is a partial cross-section view of the bobbin in FIG. 1A.

The bobbin is the type of bobbin illustrated in FIG. 1, i.e. it comprises a cylindrical reel intended to receive the wound optical fibre and, on both sides of the reel, two rims extending radially so as to retain the optical fibre in the axial direction.

One of the rims is provided with a port for the optical fibre. The dimensions of such a port are typically a few millimeters. The port is preferably arranged in the rim, in the vicinity of the reel.

A cylindrical magazine intended to receive an excess length of wound fibre is arranged in the bobbin by being separated from the reel by the rim wherein said port for the optical fibre is arranged.

The magazine can form an integral part of the reel and the rims, the bobbin thus being in one piece. Alternatively, the magazine can be presented in the form of a separate piece which is then connected onto the reel and/or the rims.

In FIGS. 3 to 6, which illustrate the device for inserting the optical fibre which allows the optical fibre to be passed through the port, only the rim 11 provided with the port 110 and the reel 10 of the bobbin are partially represented.

Figure 2:
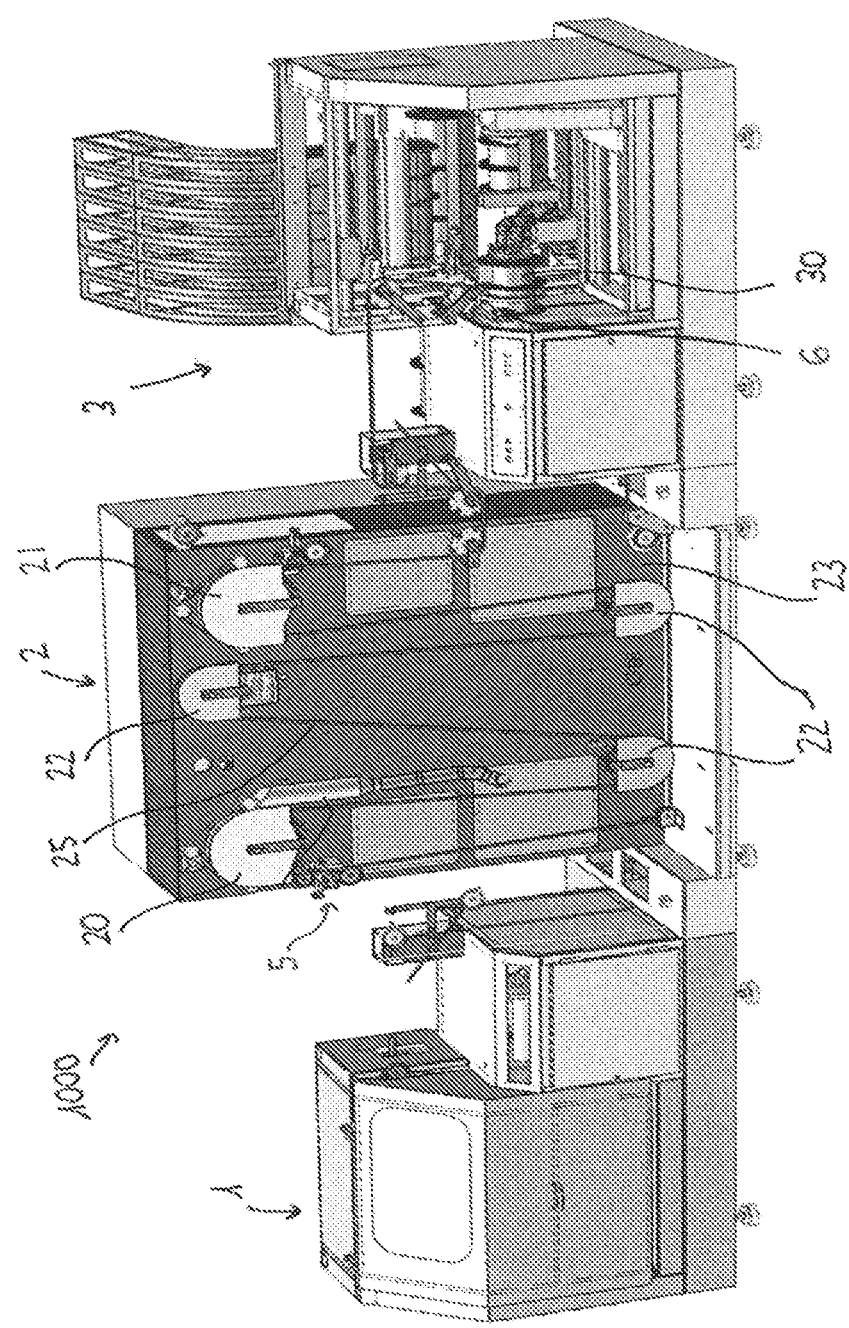
FIG. 2 is a view of the whole of the machine for producing an optical fibre, comprising an insertion device according to the invention.

FIG. 2 is a view of the whole of the machine for producing an optical fibre, which could comprise such an insertion device. However, it will be understood that the insertion device is likely to be used in other types of machine, wherein an excess length of optical fibre must be wound over a bobbin such as defined above.

The machine 1000 comprises, along the direction in which the optical fibre runs, an unwinder 1, a main area 2 and a winder 3.

The unwinder 1 is designed to receive a bobbin (not represented) of optical fibre intended to run into the main area of the machine.

The winder 3 is designed to receive an empty bobbin 30, whereon the optical fibre exiting the main area 2 is wound over the magazine in the form of an excess length before being wound over the reel.

In the case illustrated in FIG. 2 where the machine is intended to mechanically test the optical fibre, the main area 2 comprises a frame 23, whereon are arranged an input capstan 20, an output capstan 21, and a plurality of pulleys 22 arranged between the capstans, the drums of the capstans 20, 21 and the pulleys 22 being in one same vertical plane. The respective rotation speed of the capstans 20, 21 is chosen to apply a determined mechanical tension to the optical fibre. In other applications, in particular, winding (in other words, reconditioning a bobbin comprising a large length of optical fibre in a plurality of bobbins holding a smaller length of optical fibre), one single capstan (generally corresponding to the input capstan 20 in FIG. 2) can be sufficient, said capstan having the function of moving the optical fibre. Likewise, the number of pulleys illustrated in FIG. 2 is only indicative, the machine could comprise one or several pulleys.

In view of transferring the optical fibre from the unwinder to the winder, the end of the optical fibre unwound from the bobbin 10 is inserted into the main area upstream of the input capstan 20, then it is guided between the different pulleys 22 up to the output capstan 21. Downstream of the output capstan 21, the optical fibre is guided up to the bobbin 30 in view of it being wound onto said bobbin.

To automatically insert the optical fibre into the main area, then into the bobbin 30, said machine 1000 comprises an optical fibre-guiding system, comprising a transmission body 25 (for example, a chain or a strap) and a clamping element 26 (visible in FIG. 3) connected to said transmission body 25 and comprising two jaws adapted for clamping the optical fibre when they are tightened. The transmission body 25 is arranged in the form of a continuous loop on the same face of the frame 23 as the capstans 20, 21 and the pulleys 22, running in a direction parallel to that of the optical fibre between said capstans and pulleys.

When a new length of optical fibre must be transferred from the unwinder to the winder, an operator positions the optical fibre at the inlet of the main area 2 then the device 5 for gripping the optical fibre is activated so that the clamping element clamps a portion of the optical fibre next to its end (for example, just upstream of the input capstan 20). Then, the transmission body 25 moves the optical fibre held by the clamping element to the input capstan 20, the set of pulleys 22 and the output capstan 21, up to the bobbin 30. To this end, the clamping element holds the optical fibre at a determined distance from the transmission body, chosen to allow the insertion of the fibre onto each one of the pulleys.

Once the optical fibre has been guided up to the bobbin, the clamping element is brought back to the inlet of the main area, then the transmission body is stopped.

FIGS. 3 to 6 illustrate an embodiment of the device 6, allowing the automatic gripping of the optical fibre by the clamping element to pass it through the port 110.

Said device 6 is advantageously located at the outlet of the main area 2.

The device 6 mainly comprises, along the direction in which the optical fibre runs, a system 60, 61 for moving the optical fibre, a tool 63 for cutting the optical fibre and at least one first element 65 for guiding the optical fibre towards the port located in the rim 11. Optionally, a second guiding element 64 is arranged between the cutting tool 63 and the first guiding element 65.

Figure 6:
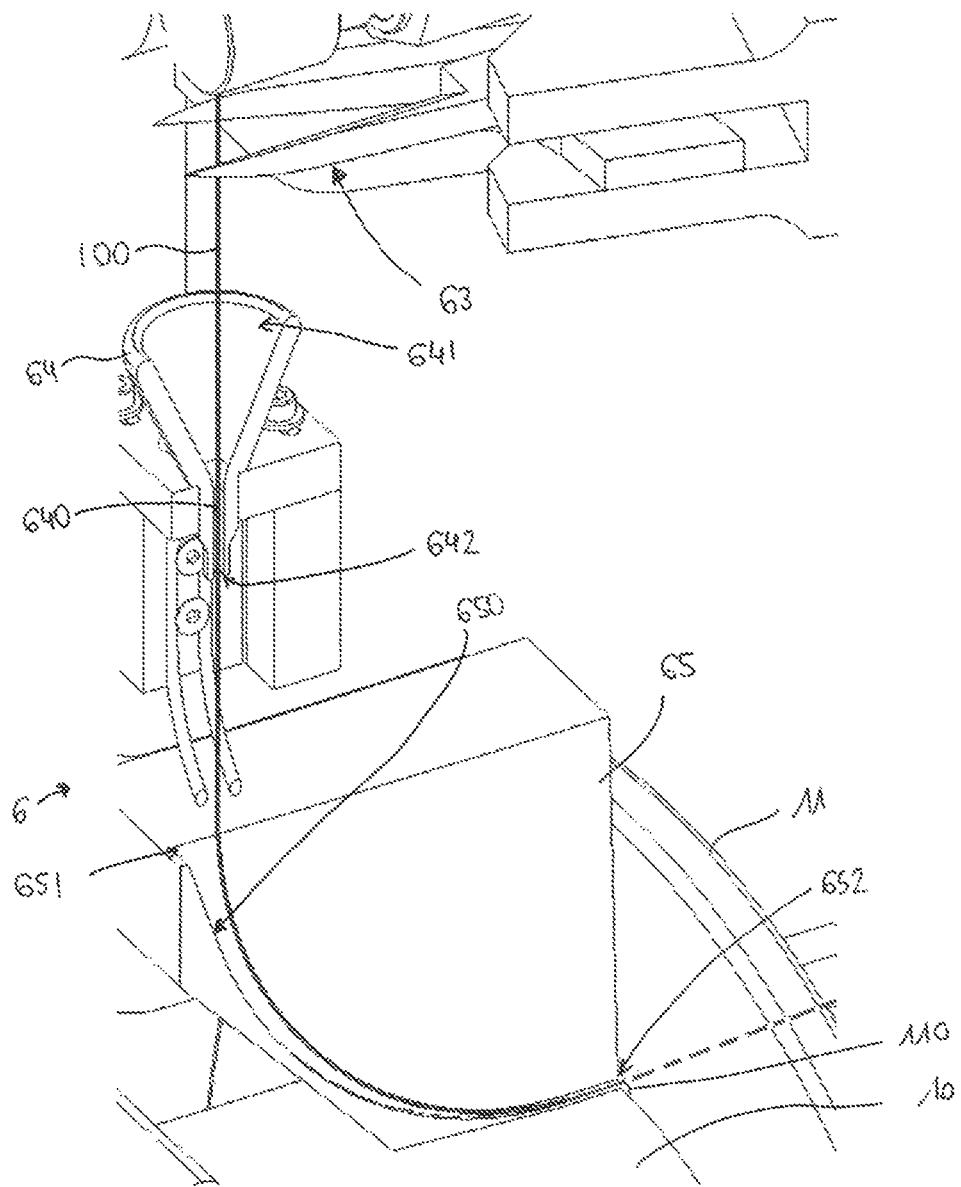
FIG. 6 is a partial cross-section view of the optical fibre-guiding elements.

As can be seen best in FIG. 6, the guiding element 65 comprises a slot that has a curved bottom 650 extending between an inlet 651 of the fibre and an outlet 652 of the fibre. According to an embodiment, the walls which, with the bottom 650, mark out the slot, are in two parallel planes. Alternatively, said walls are not parallel but tilted, so as to get closer in the lower part of the guiding element 65, so as to create a funnel effect, allowing to progressively specify the position of the optical fibre towards the outlet hole 652.

The width of the inlet 651 (in other words, the distance between the two walls, between which the slot extends) is more than the diameter of the optical fibre. The closer the inlet 651 is to the moving system 60, 61 (or, if necessary, to the second guiding element 64), the less wide said inlet 651 can be, as it is considered that the optical fibre is sufficiently guided, so that its end runs in a straight line between the moving system 60, 61 (or, if necessary, the second guiding element 64) and the inlet 651. Purely indicatively, the width of the inlet 651 is between 2 and 10 mm. The width of the outlet 652 is less than or equal to the width of the port 110. Absolutely indicatively, the width of the inlet 652 is between 0.5 and 2 mm.

Figure 3:
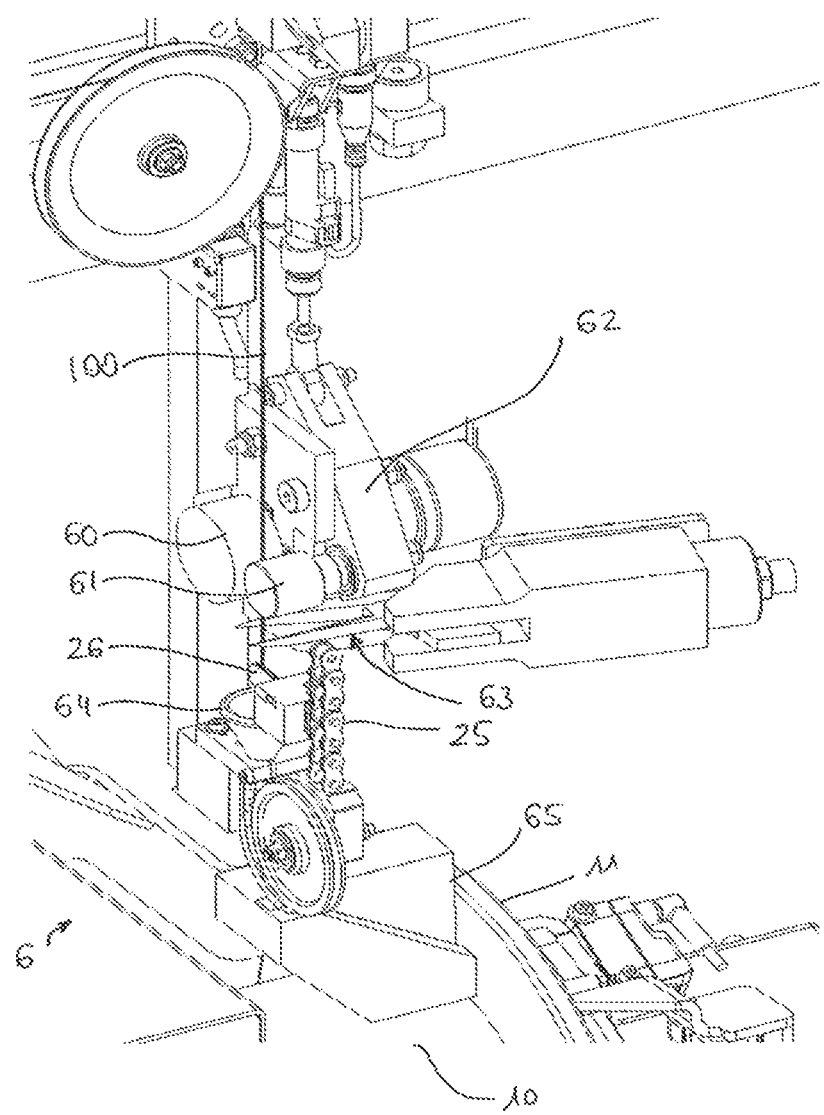
FIGS. 3 to 5 are perspective views of a device for inserting the optical fibre according to the invention, in different steps of its use.

As illustrated in FIG. 3, the optical fibre 100 is brought facing the reel 10 of the bobbin, next to the rim 11, by the aforementioned clamping element 26 (only one part of the transmission body 25, to which the clamping element 26 is attached, is represented to facilitate the legibility of the figure). In the embodiment illustrated, the bobbin is arranged with its rotating axis substantially horizontal, whereas the optical fibre is brought substantially vertically, parallel to the rim 11. Consequently, to be able to pass through the port arranged in the rim 11, the optical fibre must be curved, so as to be presented substantially horizontally facing the port.

When the clamping element is in the position illustrated in FIG. 3, the optical fibre 100 is held between two rollers 60, 61, which form part of means for moving the optical fibre to insert the optical fibre through the port. The roller 60 can be rotated by means of a motor, whereas the roller 61 is free. The distance between the two rollers is adjusted to exert a slight pressure force on the optical fibre, so that the rotation of the roller 60 can move the optical fibre forward between the circumferential surfaces of the two rollers. The moving system is connected to a support 62, which can be moved, for example, by means of a motorised arm between the position in FIG. 3 and a rest position, where it is set back from the optical fibre.

However, another system could be used for moving the optical fibre, without moving away from the framework of this invention. Such a moving system could comprise a capstan or a band-track.

In parallel to the positioning of the rollers 60, 61, on both sides of the optical fibre 100, the guiding element 65 is brought up so that the inlet 651 is facing the optical fibre 100 and that the outlet 652 is facing the port 110 of the rim 11 of the bobbin.

On the other hand, the cutting tool 63 in the form of scissors is brought up facing the optical fibre, between the rollers 60, 61 and the guiding element 65. In this situation, the blades of the cutting tool are open on both sides of the optical fibre.

Figure 4:
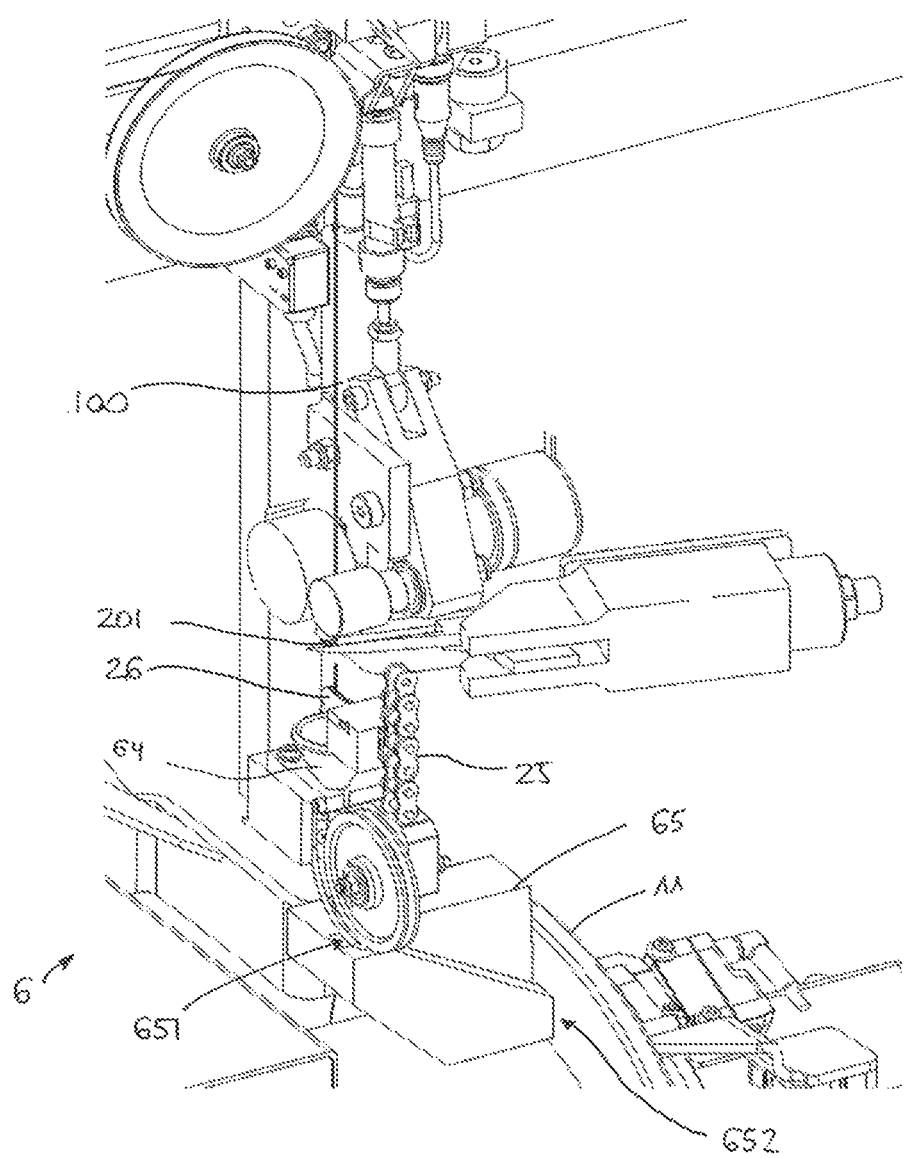

As illustrated in FIG. 4, the cutting tool 63 is activated to cut the optical fibre, by closing the blades. The portion of optical fibre located upstream of the cutting tool, along the direction the optical fibre runs, is removed so as to be disposed of. Then the blades of the cutting tool are reopened.

Figure 5:
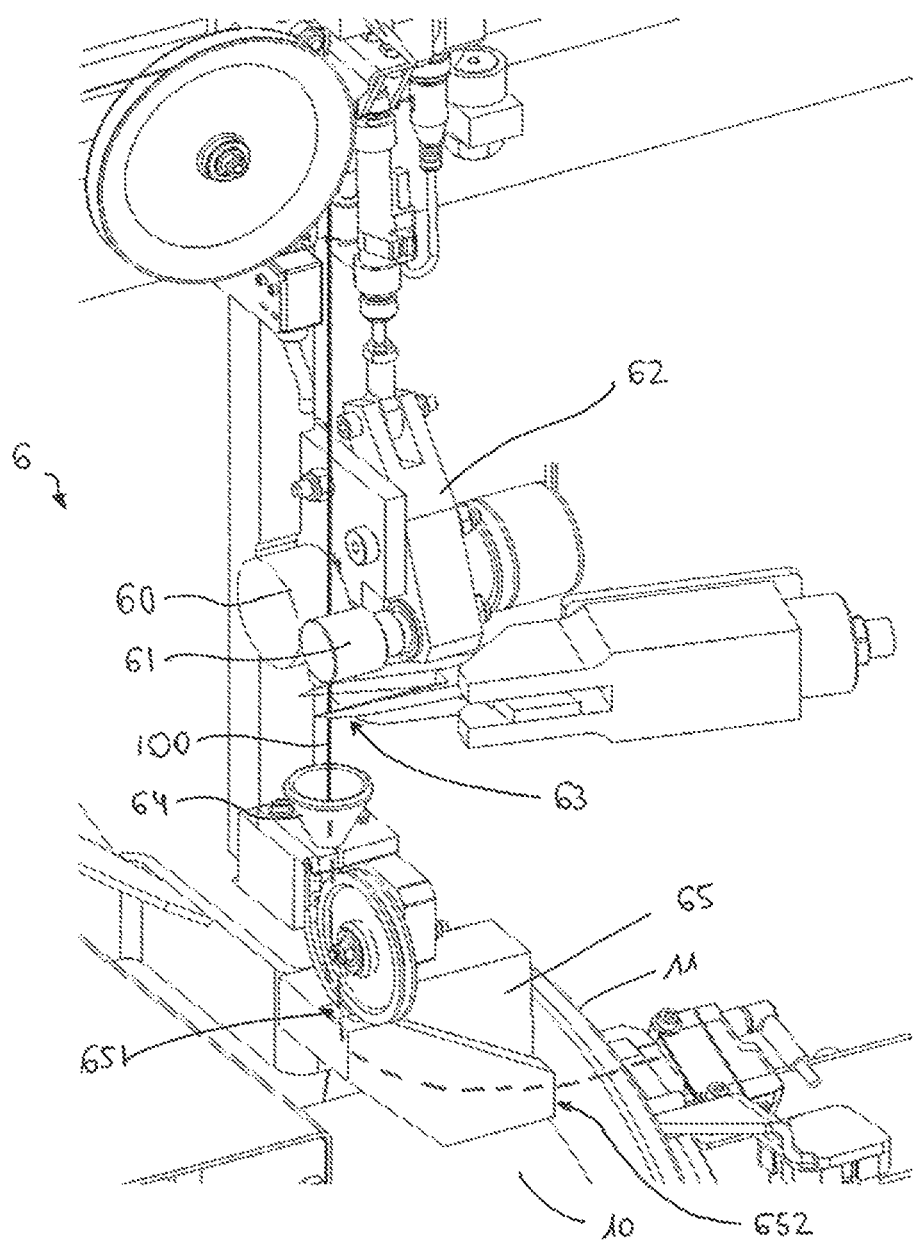

In reference to FIGS. 5 and 6, the roller 60 is then rotated so that the optical fibre 100 descends towards the guiding element 65 and passes into the inlet 651. By hitting the bottom 650 of the slot, the optical fibre curves according to the curvature of said bottom 650 and goes along it up to the outlet 652 and the port 110 of the rim 11. The optical fibre can thus pass through the port 110.

In FIGS. 3 to 6, another guiding element 64 is represented. This second guiding element advantageously supplements the first guiding element 65, but it is only optional. The second guiding element 64 is arranged between the cutting tool 63 and the first guiding element 65 along the direction the optical fibre runs.

As can be seen best in FIG. 6, the guiding element 64 has a funnel form, of which the revolution axis is vertical. Said guiding element 64 comprises an inlet 641 for the optical fibre that has a relatively wide diameter, and an outlet 642 for the optical fibre that has a relatively narrow diameter. The inside surface of the guiding element between the inlet 641 and the outlet 642 successively has a conic form then a cylindrical form, the cylindrical portion 640, which has the narrow diameter of the hole 642, having a certain length to orient the optical fibre in a vertical direction.

When functioning, the axis of the cylindrical portion 640 is parallel to the walls of the slot of the element 65, and is located preferably in a median plane of these two walls.

Advantageously, the distance between the outlet 642 of the guiding element 64 and the inlet 651 of the guiding element 65 is as small as possible, typically less than 20 mm. Possibly, the elements 64 and 65 can be assembled so as to constitute one same component.

Advantageously, the distance between the rollers 60, 61 and the inlet of the guiding element 65 (or possibly, the guiding element 64) is as small as possible, in order to control the run of the end of the optical fibre during insertion. Purely indicatively, said distance is between 5 and 30 mm. Likewise, the distance between the outlet 652 of the guiding element 65 and the rim 11 is as small as possible. Purely indicatively, said distance is between 0 and 10 mm.

The device 6 comprises a system for controlling the clamping element, the rollers, the cutting tool and the guiding element(s), configured to synchronise the actuation of these elements in view of implementing the sequence defined in reference to FIGS. 3 to 5.

The invention claimed is:

1. A device for inserting an optical fiber through a port arranged in a rim of a bobbin, comprising, along a direction in which the optical fiber runs:
    a system configured for moving the optical fiber;
    a tool configured for cutting the optical fiber; and
    a first optical fiber-guiding element comprising a slot, a base of which defines a curve between an inlet facing the moving system and an outlet configured to face the port in the rim of the bobbin.

2. The device of claim 1, further comprising, between the cutting tool and the first guiding element, a second guiding element comprising a conic portion that has an inlet for the optical fiber, wider than the outlet hole for the optical fiber.

3. The device of claim 2, wherein the second guiding element comprises a cylindrical portion below the conic portion along the direction the optical fiber runs.

4. The device of claim 1, wherein the system for moving the optical fiber comprises two rollers arranged along the direction the optical fiber runs, so as to exert a pressure on the optical fiber, one of said rollers being rotated by a motor.

5. A machine for producing an optical fiber, comprising an insertion device, wherein the insertion device includes:
    a system configured for moving the optical fiber,
    a tool configured for cutting the optical fiber, and
    a first optical fiber-guiding element comprising a slot, a base of which defines a curve between an inlet facing the moving system and an outlet configured to face the port in the rim of a bobbin.

6. The machine of claim 5, further comprising:
    at least one capstan and at least one pulley, said capstan(s) and pulley(s) defining a direction in which the optical fiber runs in a main area of said machine; and
    an optical fiber-guiding system comprising a transmission body and a clamping element rigidly connected to said body able to hold an end of the optical fiber, said transmission body being arranged parallel to the direction in which the optical fiber runs.

7. A method for inserting an optical fiber through a port arranged in a rim of a bobbin, comprising:
    providing a device for inserting an optical fiber through a port, wherein the device includes:
        a system configured for moving the optical fiber,
        a tool configured for cutting the optical fiber, and
        a first optical fiber-guiding element comprising a slot, a base of which defines a curve between an inlet facing the moving system and an outlet configured to face the port in the rim of the bobbin, wherein the port is positioned facing the outlet of the first guiding element;
    inserting the optical fiber into the moving system;
    cutting the optical fiber by the cutting tool; and
    moving the end of the optical fiber along towards the inlet for the first guiding element and the guiding of the optical fiber in the slot up to the outlet.

* * * * *